United States Patent
Norman

[11] Patent Number: 5,271,023
[45] Date of Patent: Dec. 14, 1993

[54] UNINTERRUPTABLE FAULT TOLERANT DATA PROCESSOR

[75] Inventor: John H. Norman, Chandler, Ariz.

[73] Assignee: Motorola, Inc., Schaumburg, Ill.

[21] Appl. No.: 709,869

[22] Filed: Jun. 3, 1991

[51] Int. Cl.$^5$ .............................................. G06F 11/08
[52] U.S. Cl. ................... 371/68.3; 371/9.1; 371/36; 371/68.1
[58] Field of Search ................ 371/68.1, 68.2, 68.3, 371/36, 9.1; 395/575

[56] References Cited
U.S. PATENT DOCUMENTS

| | | | |
|---|---|---|---|
| 3,403,874 | 10/1968 | Boskovich et al. | 371/36 |
| 3,681,578 | 8/1972 | Stevens | 371/36 |
| 4,375,683 | 3/1983 | Wensley | 371/36 |
| 4,593,396 | 6/1986 | Anderson, Jr. | 371/68.3 |
| 4,710,935 | 12/1987 | Kim et al. | 371/68.2 |
| 4,873,685 | 10/1989 | Millis, Jr. | 371/36 |
| 5,128,944 | 7/1992 | Flaherty et al. | 371/36 |

Primary Examiner—Vincent P. Canney
Attorney, Agent, or Firm—Frank J. Bogacz

[57] ABSTRACT

An apparatus for fault tolerant data processing has a plurality of data processors. The fault tolerant apparatus includes at least three data processors operating in tandem. The apparatus further has a plurality of fault tolerant comparators. Each fault tolerant comparator is connected to a corresponding one of the data processors for receiving data from the corresponding data processor. Each fault tolerant comparator is further connected to each of the other fault tolerant comparators, with each fault tolerant comparator comparing output signals from the other fault tolerant comparators in a pairwise fashion to eliminate data output signals from any faulty data processors. The apparatus finds application in uninterruptible multiprocessor synchronization as well as data encryption in secure telephony.

16 Claims, 4 Drawing Sheets

UNINTERRUPTABLE FAULT TOLERANT DATA PROCESSOR

BACKGROUND OF THE INVENTION

The present invention pertains to fault tolerant data processing, and, more particularly, to uninterrupted fault tolerant data processing for high reliability applications.

Data errors, or faults, are inevitable in digital data processing systems and are in part due to the complexity of the circuitry, the associated peripheral and ancillary devices, and the process control software. To permit error-free data to be generated, processed, transmitted, and received, even in the event of the occurrence of a fault, the art has developed a number of approaches for detecting when faults have occurred and then suspending operations until the defective processing element has been replaced or alternatively rendered operational. In many applications it is extremely undesirable to suspend data processing when faults are detected and so a variety of techniques and apparatuses have been developed to achieve continued system operation despite fault occurrences, albeit with some delay which occurs as the system determines the nature of the fault and the appropriate corrective action(s). Certain systems, for example, the flight control system of a spacecraft during launch, cannot tolerate even momentary lapses in data processing, nor can an error be permitted to occur. The art has developed systems for successfully providing the required degree of confidence. In such computer systems independent self-checking computer modules remove themselves if a fault is detected.

Another strategy for providing fault tolerance in digital systems is to employ groups of identical processors performing identical tasks together with voting arrangements such that when one processor disagrees with the remainder of the processors, it is removed from use.

For example, secure telephony relies on processing of voice, facsimile, or other analog data and conversion to digital form, followed by encryption of the digital data via key generators/(data processors). The key generator produces a unique bit stream in response to input data. The unique bit stream can be decrypted by the receiver to reproduce the digital data. The digital data are then employed to generate a replica of the original analog data.

A current practice in enhancing system robustness is to employ a pair of key generators encrypting the same data in tandem. When a fault condition is identified through key generator output signal comparisons or other means, these key generators are shut down and a third key generator is switched into service to provide data encryption. This process may result in interruption of the encryption process and does not achieve a maximum mean time between failures possible for a triply redundant system, for example.

In light of the foregoing discussion, it will be appreciated that there are real needs for data processing systems wherein data processing is neither corrupted or interrupted, even in the event of soft malfunctions or hardware error or failure.

SUMMARY OF THE INVENTION

In accordance with the present invention, an apparatus for fault tolerant data processing has a plurality of data processors. The apparatus includes at least three data processors operating in tandem, where each data processor has common clocking signals and input signals. The apparatus further has a plurality of fault tolerant comparators. Each fault tolerant comparator is connected to a corresponding one of the data processors for receiving data from the corresponding data processor. Each fault tolerant comparator is further connected to each of the other fault tolerant comparators, with each fault tolerant comparator comparing output signals from the other fault tolerant comparators in a pairwise fashion to eliminate data output signals from any faulty data processors.

DESCRIPTION OF THE PREFERRED EMBODIMENT

Figure 1:
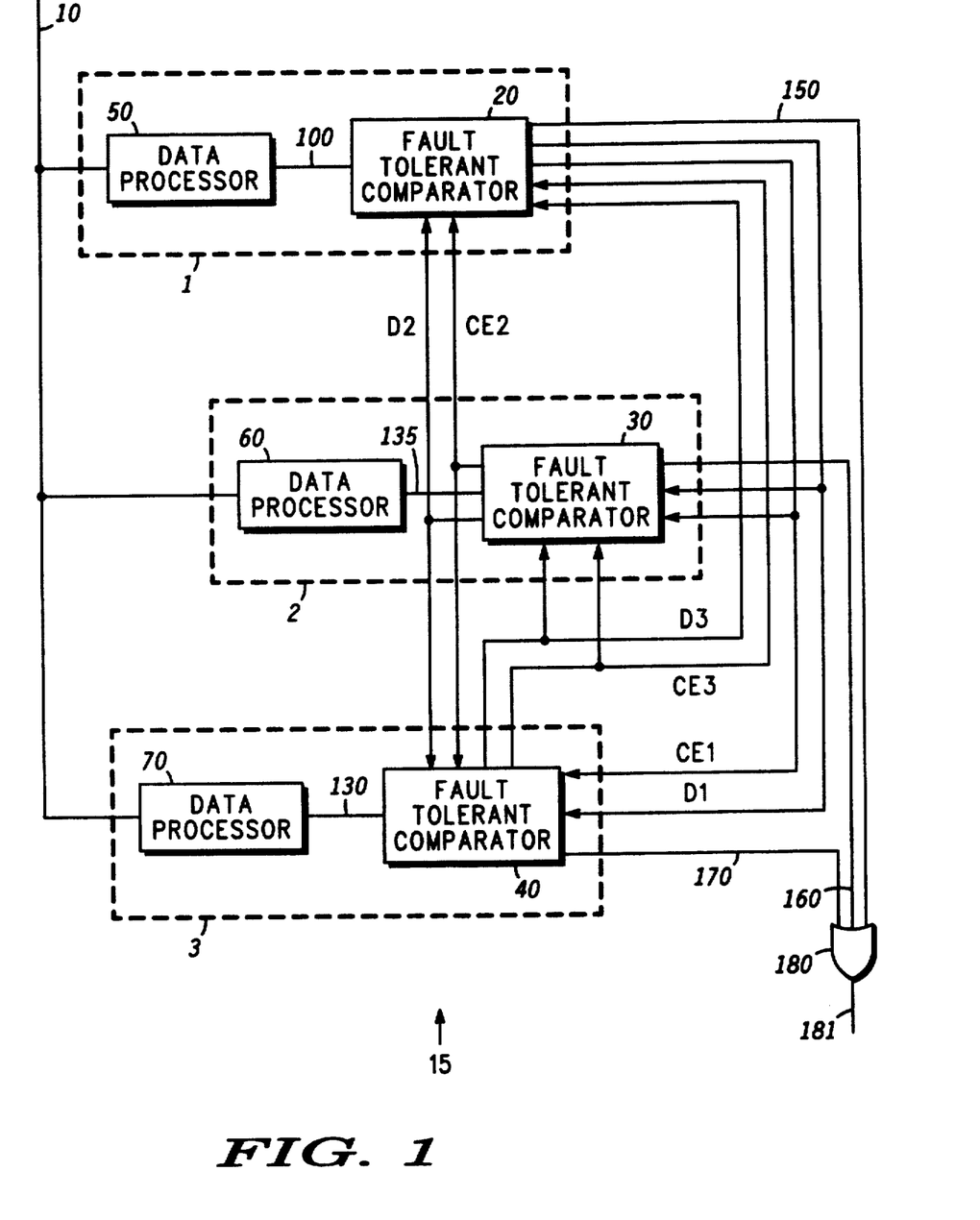
FIG. 1 is a block diagram of a fault tolerant data processor arrangement in accordance with the present invention.

FIG. 1 is a block diagram of a fault tolerant data processor arrangement 15. The data processor arrangement 15 includes fault tolerant comparators (FTCs) 20, 30, and 40. Processor arrangement 15 also includes data processors 50, 60, and 70, corresponding respectively to FTCs 20, 30, and 40. Data/clock input bus 10 is connected to data processors 50, 60, and 70. FTC 20 is connected to FTCs 30 and 40 by the CEI (compare error 1) lead. FTC 30 is connected to FTCs 20 and 40 via the CE2 lead. FTC 40 is connected to FTCs 20 and 30 via the CE3 lead. The output leads 150, 160, and 170 of FTC circuits 20, 30, and 40 are connected to OR-gate 180. OR-gate 180 provides data output on lead 181 when at least two of the FTCs 20, 30, 40 provide substantially identical data.

Data processor 50 is connected to FTC 20 via bus 100 which supplies parallel data, reset, and clock signals to FTC 20. Similarly, FTCs 30 and 40 are connected to data processors 60 and 70, respectively, via buses 135 and 130, respectively.

Each FTC allows comparison of the output data from any two of the other processors. That is, the FTC 20 of fault tolerant data processor 1 compares the data of processors 60 and 70 which is transmitted through FTCs 30 and 40, respectively. Similarly, FTC 30 of fault tolerant processor 2 compares data from processors 50 and 70, while FTC 40 of fault tolerant processor 3 compares data from processors 50 and 60.

Circuit 15 allows comparison of the output data from any two of data generators 50, 60, and 70. Each FTC 20, 30, 40 compares the other two of data processor 50, 60, 70 outputs and provides a false output signal, a logical zero, whenever these output signals differ. This can only occur if a fault has occurred when the data processors 50, 60, and 70 are each operating on the same input data (e.g., in tandem). Circuit 15 is thus a fault tolerant data processor circuit which degrades gracefully in the event of component failures and which does not interrupt data processing as long as at least two of the data processors 50, 60, 70 is operational. Data processors 50, 60, 70 may comprise microprocessors, key generators for secure communication systems utilizing data encryption, decryption, and transmission security, or other digital computational engines.

The arrangement disclosed in FIG. 1 can be constructed to allow an arbitrary number of data processing circuits to operate in tandem, with pairwise or other comparison schemes employed. Use of more than three data processing circuits allows for a higher degree of confidence in system operation and a greater mean time between failures for a given component failure rate than do three data processing circuits operating in tandem, at increased cost, size, and power consumption.

Figure 2:
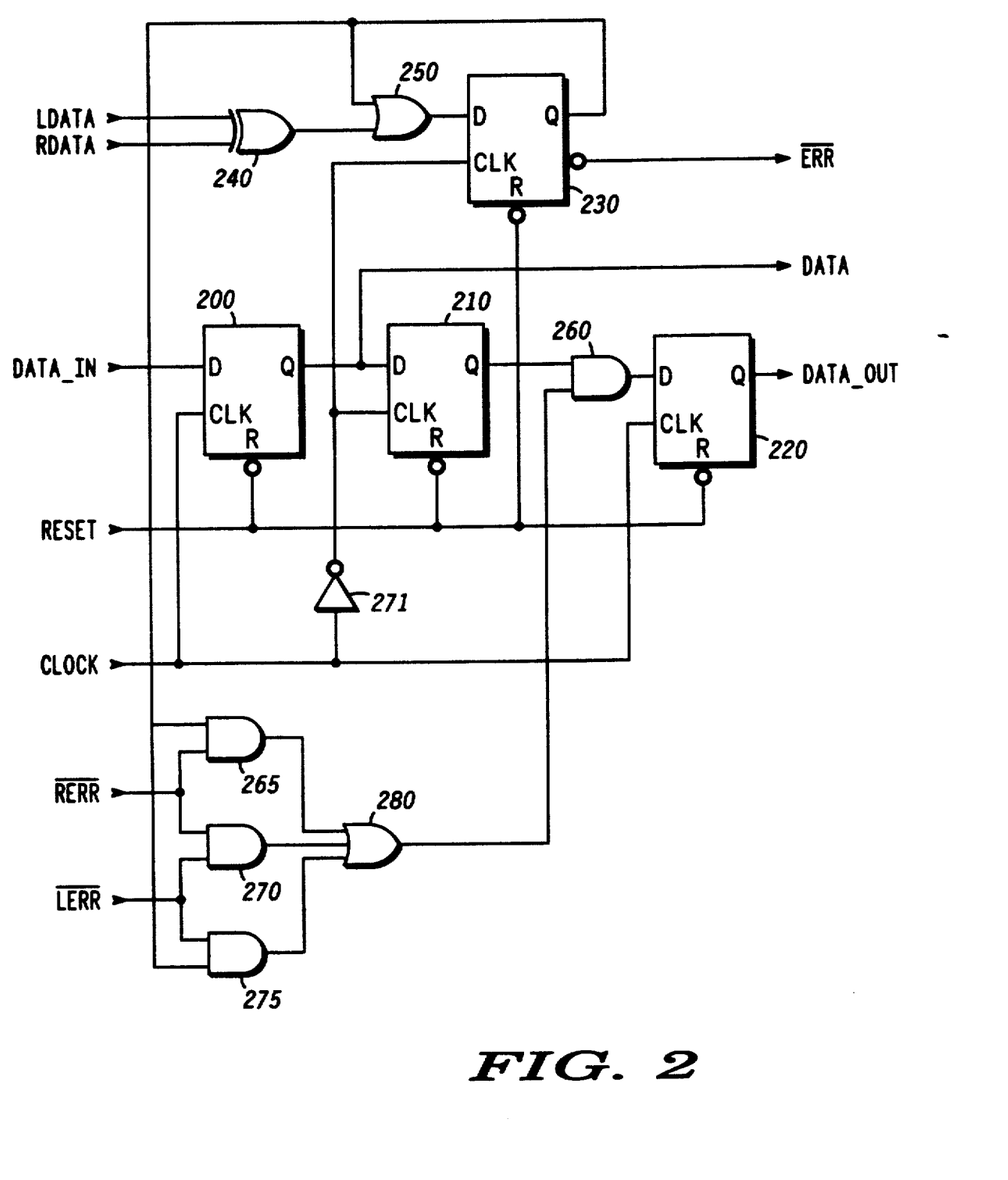
FIG. 2 is a schematic diagram of an FTC shown in FIG. 1.

FIG. 2 illustrates a schematic diagram of a FTC 20, 30, or 40. FTC 20, 30, or 40 each include flip-flops 200, 210, 220, 230, exclusive-OR 240, OR gates 250, 280, AND gates 255, 265, 270, 275 and inverter 271. Exclusive-OR gate 240 receives the LDATA and RDATA signals from the other two FTCs and is connected to OR gate 250. OR gate 250 is connected to D type flip-flop 230. Flip-flop 230 provides the comparison error signal $\overline{ERR}$. Flip-flop 200 is connected to the data processor corresponding to the particular FTC via the DATA IN lead. Flip-flop 200 provides the data output on the DATA lead which is transmitted to the other FTCs. Flip-flop 200 is connected to flip-flop 210 which is connected to AND gate 260 and in turn to flip-flop 220. Flip-flop 220 provides the data output on the DATA OUT lead. AND gates 265, 270, and 275 are connected to the error signals of the other FTCs. AND gates 265, 270, and 275 are connected to OR gate 280 which is connected to AND gate 260 via the OUTPUT ENABLE lead.

In operation, each of FTC 20, 30, or 40 compares error signals from two other FTCs 20, 30, 40 by means of AND gates 265, 270, and 275, which compare the error signals on leads $\overline{RERR}$ and $\overline{LERR}$ to the error state recorded by flip-flop 230. Flip-flop 230 records any errors (miscomparisons) in the actual data output of the other two remaining FTCs. In the event that the error status is satisfactory, OR gate 280 via the OUTPUT ENABLE lead produces a true output signal, allowing the data of the DATA IN lead to be transmitted via AND gate 260. Flip-flop 200 latches data transmitted from the associated processor. These data are transmitted to the other FTCs for analysis and to flip-flop 210 where it is latched. Flip-flop 210 transmits data to AND gate 260 where the OUTPUT ENABLE signal enables AND gate 260 to transmit data through flip-flop 220 on the DATA OUT lead to the OR-gating function, gate 180 of FIG. 1. If an error is detected, the OUTPUT ENABLE signal is false and AND gate 260 is inhibited from transmitting data on the DATA OUT lead.

Inverter 271 supplies the correct clock signal phasing to flip-flops 210 and 230. Input data from the other two data processors are compared by exclusive-OR 240. Exclusive-OR gate 240 provides a true output signal only when the input data differ. This error condition is passed via OR gate 250 to error flagging flip-flop 230, which records the error state with a true output signal. The error state is latched via the other input of OR gate 250.

Table I gives a truth table error status of each FTC versus the status of the output enabling signal on the OUTPUT ENABLE lead for the three secure fault tolerant situation as shown in FIG. 1.

TABLE I

FTC output truth table

| FTC 20 | $\overline{ERR}$ 30 | 40 | OUTPUT ENABLE 20 | 30 | 40 | |
|---|---|---|---|---|---|---|
| 0 | 0 | 0 | 1 | 1 | 1 | No errors, all enabled |
| 0 | 0 | 1 | 0 | 0 | 1 | Enable FTC 40 only |
| 0 | 1 | 0 | 0 | 1 | 0 | Enable FTC 30 only |
| 0 | 1 | 1 | 0 | 1 | 1 | FTCs 30 & 40 enabled |
| 1 | 0 | 0 | 1 | 0 | 0 | Enable 20 only |
| 1 | 0 | 1 | 1 | 0 | 1 | FTCs 20 & 40 enabled |
| 1 | 1 | 0 | 1 | 1 | 0 | FTCs 20 & 30 enabled |
| 1 | 1 | 1 | 0 | 0 | 0 | All FTCs disabled |

Figure 3:
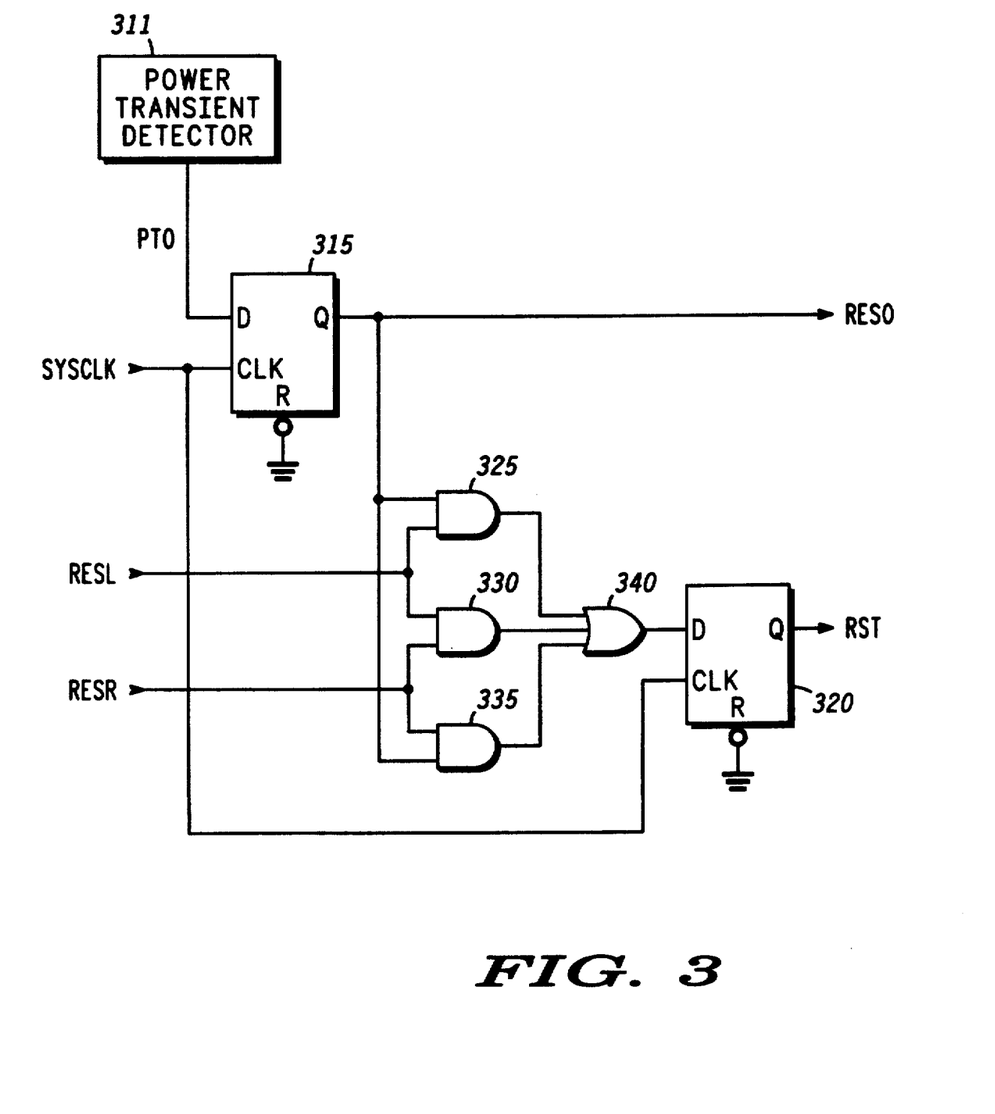
FIG. 3 is a schematic diagram of a power on reset circuit for use with the present invention.

FIG. 3 depicts a schematic diagram of a power on reset circuit for use with each FTC 20, 30, 40, comprising flip-flops 315 and 320, AND gates 325, 330, and 335, and OR gate 340. A power transient detector (PTD) is connected to flip-flop 315. The Q output of flip-flop 315 provides the RESO output which is transmitted to the other two FTCs (as RESL and RESR respectively). The RESO leads from the other two FTCs are connected to AND gates 325, 330, and 335. The outputs of AND gates 325, 330 and 335 are connected to OR gate 340. The output of OR gate 340 is connected to flip-flop 320. The RST output of flip-flop 320 provides the signal to initialize the particular data processor and associated FTC.

Each power on reset circuit operates, similar to its associated FTC, by comparing output signals on the RESO leads from the other two power on reset circuits and a third power on signal from the corresponding FTC and data processor. Each data processor/FTC combination has an external PTD for detecting power interruptions. The signal from the corresponding PTD is input to flip-flop 315 and latched; the output of flip-flop 315 is transmitted to the other two power on reset circuits and to AND gates 325 and 335. AND gates 325, 330, and 335 compare power on reset signals from the other two power on reset circuits with the status of flip-flop 315. AND gates 325, 330, and 335 provide a true output signal(s) which is transmitted to OR gate 340 in the event that two or more power on reset signals of the PTDs are true. The output of OR gate 340 is latched by flip-flop 320. A true output from flip-flop 320 causes the system to reset.

The arrangement of FIG. 3 allows the system to operate as long as two of the power on reset circuits are operational. As such, no single power on reset circuit failure can cause data processing system failure.

The fault-tolerant comparator coupled with a data processor forms a fault tolerant data processor module. A group of three or more such modules form a high reliability, fault tolerant, and uninterruptible data processing system. In the event of failure of any one module, the fault tolerant comparators determine which module is faulty and exclude this module from forming the output signal. This ensures accurate data processing and occurs in such a way as to avoid interruption of the data being output.

Interruptions in secure telephony result in the need to re-synchronise the transmitter and receiver, as well as the need to re-establish security provisions, providing delays which the present invention obviates by avoiding interruption of the output data. The addition of power on reset circuits to each fault tolerant data processing module provides an additional degree of robustness to the overall system, by flagging those power interruptions which can trigger errors and resetting the system in the event that two or more power on reset circuits are indicating that a power transient has occurred.

Figure 4:
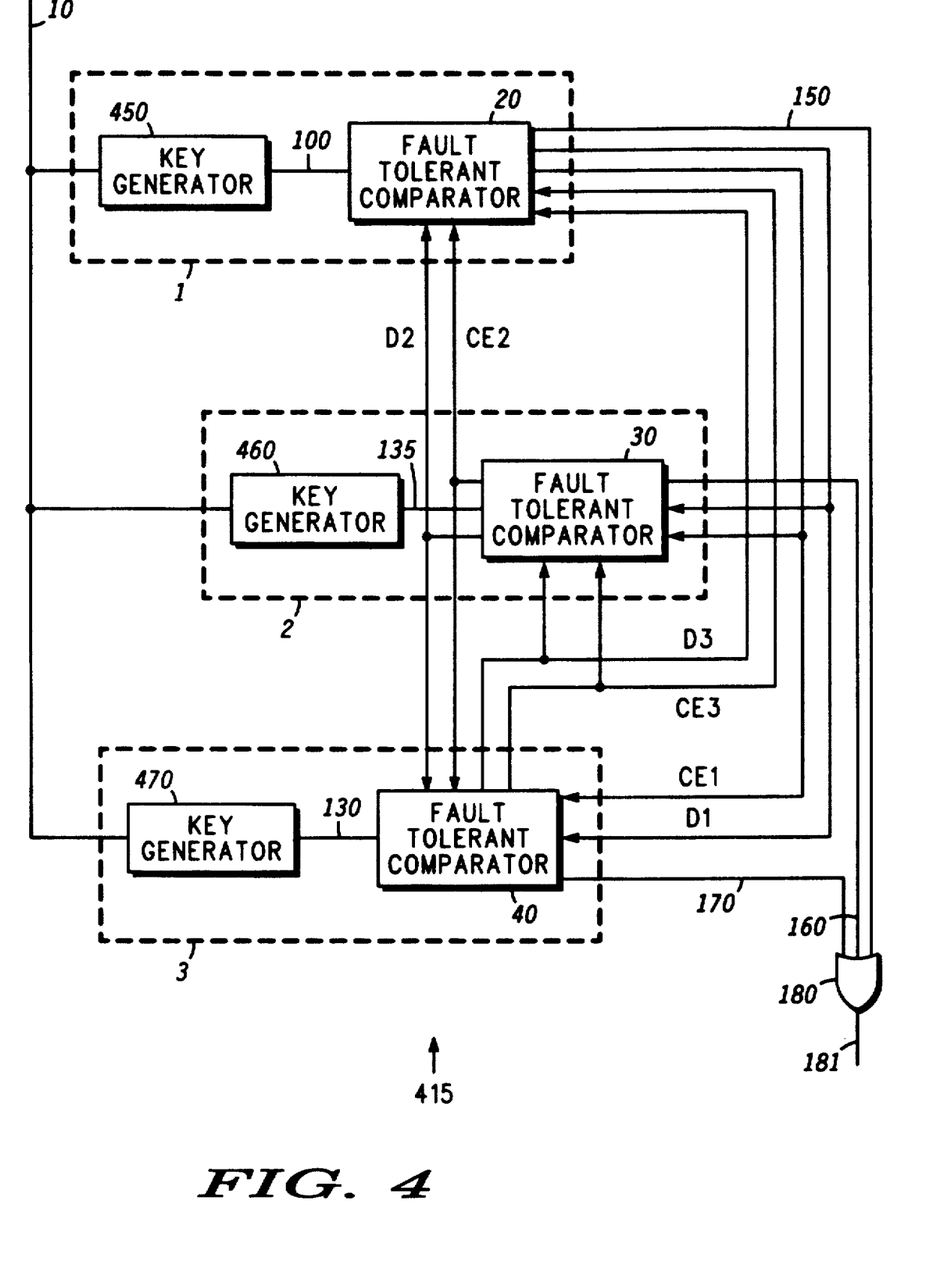
FIG. 4 is a block diagram of the fault tolerant key generator arrangement in accordance with the present invention.

FIG. 4 is a block diagram of a fault tolerance key generator arrangement 415. Key generators 450, 460 and 470 functionally replace the processors 50, 60 and 70 of FIG. 1. The operation of the key generators 450, 460 and 470 is functionally equivalent to that described in FIG. 1.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. Apparatus for fault tolerant data processing comprising:
   a plurality of data processors including at least one and two other data processors operating in tandem, each data processor having common clocking signals and input signals;
   a plurality of fault tolerant comparators including at least one and two other fault tolerant comparators, each fault tolerant comparator connected to a corresponding one of said data processors for receiving data from said corresponding one data processor, each fault tolerant comparator further connected to each of said other fault tolerant comparators, each said fault tolerant comparator for comparing output signals from said other fault tolerant comparators in a pairwise fashion to eliminate said output signals from any faulty data processors;
   said connection of said each fault tolerant comparator to said other fault tolerant comparators including;
   first data input connection means for receiving data from said corresponding data processor;
   first data output connection means for transmitting said data from said corresponding data processor to said other fault tolerant comparators;
   error input connection means for receiving comparison error signals from each of said other fault tolerant comparators;
   error output connection means for transmitting a comparison error signal from said one fault tolerant comparator to said other fault tolerant comparators;
   second data input connection means for receiving data from said other data processors; and
   second data output connection means for transmitting said data from said corresponding data processor;
   each said fault tolerant comparator includes;
   first comparing means coupled to said second data input connection means and to said error output connection means, said first comparing means for comparing data outputs from said first data output data connection means of said other data processors; and
   first gating means coupled to said error output connection means of said other data processors and coupled to said first comparing means, said first gating producing an output enable signal for a comparison of said comparison error signals from said other data processors;
   said first comparing means includes:
   exclusive-OR gating means coupled to said second data input connection means;
   first OR gating means coupled to said exclusive-OR gating means; and
   first latching means coupled to said first OR gating means and to said first gating means, said first latching means for producing said comparison error signal;
   said first gating means includes;
   first AND gating means coupled to said first latching means and to said error input connection means from a first of said other fault tolerant comparators, said first AND gating means producing a first precursor output enable signal from comparison of said output enable signal of said first latching means with said comparison error signal of said first other fault tolerant comparator;
   second AND gating means coupled to said first latching means and to said error input connection means from a second of said other fault tolerant comparators, said second AND gating means producing a second precursor output enable signal from comparison of said output enable signal of said first latching means with said comparison error signal of said second other fault tolerant comparator;
   third AND gating means coupled to said error input connection means of said first other fault tolerant comparator and to said error input connection means from said second other fault tolerant comparator, said third AND gating means producing a third precursor output enable signal from comparison of said comparison error signal from said first other fault tolerant comparator with said error comparison signal of said second other fault tolerant comparator;
   second OR gating means for providing an output enable signal to said first control means, said second OR gating means being coupled to said first, second, and third AND gating means to produce a true output enable signal if any of said first, second, or third precursor output enable signals are true.

2. Apparatus for fault tolerant data processing as claimed in claim 1, wherein each said fault tolerant comparator includes:
   first comparing means coupled to said second data input connection means and to said error output connection means, said first comparing means for comparing data outputs from said first data output data connection means of said other data processors;
   first gating means coupled to said error output connection means of said other data processors and coupled to said first comparing means, said first gating producing an output enable signal for a comparison of said comparison error signals from said other data processors; and
   first control means coupled to said first data input connection means, to said first gating means and to said first and second data output connection means, said first control means for transmitting said data from said corresponding processor only if said data corresponds with data from said other data processors.

3. Apparatus for fault tolerant data processing as claimed in claim 2, wherein said first control means includes:
   first flip-flop means coupled to said first data input connection means and to said first data output connection means, said first flip-flop means for providing a delay of one clock cycle for transmission of said data from said first data input connection means to said first data output connection means;

second flip-flop means coupled to said first flip-flop means, said second flip-flop means for providing a delay of one clock cycle for transmission of said data;

fourth AND gating means coupled to said second flip-flop means and to said second OR gating means, said fourth AND gating means enabling data transmission from said second flip-flop means when said output enable signal is true and disabling data transmission from said second flip-flop means when said output enable signal is false; and third flip-flop means coupled to said fourth AND gating means and to said second output connection means, said third flip-flop means transmitting said data to said second output connection means when said fourth AND gating means enables transmission of said data.

4. Apparatus for fault tolerant data processing as claimed in claim 1, wherein each fault tolerant comparator further includes:

a power transient detector for detecting power supply fluctuations and producing a power transient signal;

power on reset circuit means coupled to said power transient detector and to two other of said power on reset circuit means of said other fault tolerant comparators, said power on reset circuit means being further coupled to all fault tolerant comparators and to all data processors to effect resetting of said all fault tolerant comparators and all data processors when two or more of said power on reset circuit means indicate a power supply fluctuation.

5. Apparatus for fault tolerant data processing as claimed in claim 4, wherein each power on reset circuit means further comprises:

first input connection means for receiving power transient signals from said power transient detector;

second input connection means for receiving power on reset signals from first and second of said other power on reset circuit means;

first output connection means for transmitting a first reset signal to said first and second other power on reset circuit means;

second output connection means for transmitting a second reset signal to each of said fault tolerant comparators and data processors.

6. Apparatus for fault tolerant data processing as claimed in claim 5, each power on reset circuit means further including:

gating means coupled to said first flip-flop means, said second input signal connection means and to said second output connection means.

first flip-flop means coupled to said power transient detector, to said second input connection means, and to said gating means, said first flip-flop means for latching said power transient signal from said power transient detector and transmitting said first reset signal to said other of said power on reset circuit means via said first output connection means, said first flip-flop means further coupled to said gating means to provide said first reset signal to said gating means; and second flip-flop means coupled to gating means and to said second output connection means, said second flip-flop means for providing said second reset signal to said second output connection means.

7. Apparatus for fault tolerant data processing as claimed in claim 6, wherein said gating means includes:

first AND gating means coupled to said second input means of said first and second of said other power on reset means, said first AND gating means producing a true first precursor reset signal when said power on reset signals from each of said other of said power on reset circuit means are true;

second AND gating means coupled to said first of said other power on reset circuit means and to said first flip-flop means, said second AND gating means producing a true second precursor reset signal when said power on reset signal from said first of said other power on reset circuit means and said first reset signal from said first flip-flop means are true;

third AND gating means coupled to said second of said other power on reset circuit means and to said first flip-flop means, said third AND gating means producing a true third precursor reset signal when said power on reset signal from said second of said other power on reset circuit means and said first reset signal from said first flip-flop means are true;

OR gating means coupled to said first, second, and third AND gating means and to said second flip-flop means, said OR gating means for producing said second reset signal when any of said first, second, or third precursor reset signals are true.

8. Apparatus for fault tolerant data processing as claimed in claim 3, wherein there is further included:

third OR gating means coupled to said third flip-flop means of each of said fault tolerant comparators, said third OR gating means producing a data output signal when at least two of said fault tolerant comparators produce substantially identical data.

9. In a secure communications system, a fault tolerant processing arrangement comprising:

a plurality of key generators including at least one and two other key generators operating in tandem, each key generator having common clocking signals and input signals;

a plurality of fault tolerant comparators including at least one and two other fault tolerant comparators, each fault tolerant comparator connected to a corresponding one of said key generators for receiving data from said corresponding one key generator, each fault tolerant comparator further connected to each of said other fault tolerant comparators, each said fault tolerant comparator for comparing output signals from said other fault tolerant comparators in a pairwise fashion to eliminate said output signals from any faulty key generators said connection of said each fault tolerant comparator to said other fault tolerant comparators including:

first data input connection means for receiving data from said corresponding key generator;

first data output connection means for transmitting said data from said corresponding key generator to said other fault tolerant comparators;

error input connection means for receiving comparison error signals from each of said other fault tolerant comparators;

error output connection means for transmitting a comparison error signal from said one fault tolerant comparator to said other fault tolerant comparators;

second data input connection means for receiving data from said other key generators; and second data output connection means for transmitting said data from said corresponding key generator;

each said fault tolerant comparator includes:

first comparing means coupled to said second data input connection means and to said error output connection means, said first comparing means for comparing data outputs from said first data output data connection means of said other key generators;

first gating means coupled to said error output connection means of said other key generators and coupled to said first comparing means, said first gating producing an output enable signal for a comparison of said comparison error signals from said other key generators;

said first comparing means includes:

exclusive-OR gating means coupled to said second data input connection means;

first OR gating means coupled to said exclusive-OR gating means; and first latching means coupled to said first OR gating means and to said first gating means, said first latching means for producing said comparison error signal;

said first gating means includes:

first AND gating means coupled to said first latching means and to said error input connection means from a first of said other fault tolerant comparators, said first AND gating means producing a first precursor output enable signal from comparison of said output enable signal of said first latching means with said comparison error signal of said first other fault tolerant comparator;

second AND gating means coupled to said first latching means and to said error input connection means from a second of said other fault tolerant comparators, said second AND gating means producing a second precursor output enable signal from comparison of said output enable signal of said first latching means with said comparison error signal of said second other fault tolerant comparator;

third AND gating means coupled to said error input connection means of said first other fault tolerant comparator and to said error input connection means from said second other fault tolerant comparator, said third AND gating means producing a third precursor output enable signal from comparison of said comparison error signal from said first other fault tolerant comparator with said error comparison signal of said second other fault tolerant comparator;

second OR gating means for providing an output enable signal to said first control means, said second OR gating means being coupled to said first, second, and third AND gating means to produce a true output enable signal if any of said first, second, or third precursor output enable signals are true.

10. A fault tolerant processing arrangement as claimed in claim 9, wherein each said fault tolerant comparator includes:

first comparing means coupled to said second data input connection means and to said error output connection means, said first comparing means for comparing data outputs from said first data output data connection means of said other key generators;

first gating means coupled to said error output connection means of said other key generators and coupled to said first comparing means, said first gating producing an output enable signal for a comparison of said comparison error signals from said other key generators; and first control means coupled to said first data input connection means, to said first gating means and to said first and second data output connection means, said first control means for transmitting said data from said corresponding processor only if said data corresponds with data from said other key generators.

11. A fault tolerant processing arrangement as claimed in claim 10, wherein said first control means includes:

first flip-flop means coupled to said first data input connection means and to said first data output connection means, said first flip-flop means for providing a delay of one clock cycle for transmission of said data from said first data input connection means to said first data output connection means;

second flip-flop means coupled to said first flip-flop means, said second flip-flop means for providing a delay of one clock cycle for transmission of said data;

fourth AND gating means coupled to said second flip-flop means and to said second OR gating means, said fourth AND gating means enabling data transmission from said second flip-flop means when said output enable signal is true and disabling data transmission from said second flip-flop means when said output enable signal is false; and third flip-flop means coupled to said fourth AND gating means and to said second output connection means, said third flip-flop means transmitting said data to said second output connection means when said fourth AND gating means enables transmission of said data.

12. A fault tolerant processing arrangement as claimed in claim 9, wherein each fault tolerant comparator further includes:

a power transient detector for detecting power supply fluctuations and producing a power transient signal;

power on reset circuit means coupled to said power transient detector and to two other of said power on reset circuit means of said other fault tolerant comparators, said power on reset circuit means being further coupled to all fault tolerant comparators and to all key generators to effect resetting of said all fault tolerant comparators and all key generators when two or more of said power on reset circuit means indicate a power supply fluctuation.

13. A fault tolerant processing arrangement as claimed in claim 12, wherein each power on reset circuit means further comprises:

first input connection means for receiving power transient signals from said power transient detector;

second input connection means for receiving power on reset signals from first and second of said other power on reset circuit means;

first output connection means for transmitting a first reset signal to said first and second other power on reset circuit means;

second output connection means for transmitting a second reset signal to each of said fault tolerant comparators and key generators.

14. A fault tolerant processing arrangement as claimed in claim 13, each power on reset circuit means further including:
gating means coupled to said first flip-flop means, said second input signal connection means and to said second output connection means.
first flip-flop means coupled to said power transient detector, to said second input connection means, and to said gating means, said first flip-flop means for latching said power transient signal from said power transient detector and transmitting said first reset signal to said other of said power on reset circuit means via said first output connection means, said first flip-flop means further coupled to said gating means to provide said first reset signal to said gating means; and
second flip-flop means coupled to gating means and to said second output connection means, said second flip-flop means for providing said second reset signal to said second output connection means.

15. A fault tolerant processing arrangement as claimed in claim 14, wherein said gating means includes:
first AND gating means coupled to said second input means of said first and second of said other power on reset means, said first AND gating means producing a true first precursor reset signal when said power on reset signals from each of said other of said power on reset circuit means are true;
second AND gating means coupled to said first of said other power on reset circuit means and to said first flip-flop means, said second AND gating means producing a true second precursor reset signal when said power on reset signal from said first of said other power on reset circuit means and said first reset signal from said first flip-flop means are true;
third AND gating means coupled to said second of said other power on reset circuit means and to said first flip-flop means, said third AND gating means producing a true third precursor reset signal when said power on reset signal from said second of said other power on reset circuit means and said first reset signal from said first flip-flop means are true;
OR gating means coupled to said first, second, and third AND gating means and to said second flip-flop means, said OR gating means for producing said second reset signal when any of said first, second, or third precursor reset signals are true.

16. A fault tolerant processing arrangement as claimed in claim 11, wherein there is further included:
third OR gating means coupled to said third flip-flop means of each of said fault tolerant comparators, said third OR gating means producing a data output signal when at least two of said fault tolerant comparators produce substantially identical data.

* * * * *

UNITED STATES PATENT AND TRADEMARK OFFICE
CERTIFICATE OF CORRECTION

PATENT NO. : 5,271,023
DATED : December 14, 1993
INVENTOR(S) : John Howard Norman It is certified that error appears in the above-indentified patent and that said Letters Patent is hereby corrected as shown below:

In column 9, claim 10, line 62 through column 10, line 6, delete the text beginning with the colon in column 10, line 62 and including the first and second paragraphs of claim 9 through column 10 line 6.

Signed and Sealed this

Fourth Day of July, 1995

Attest:

BRUCE LEHMAN

Attesting Officer      Commissioner of Patents and Trademarks